April 20, 1937.  A. R. PRIBIL  2,077,710
INDEPENDENT CONTROLLED CUSHION WHEEL UNIT
Filed Sept. 14, 1935   2 Sheets-Sheet 1
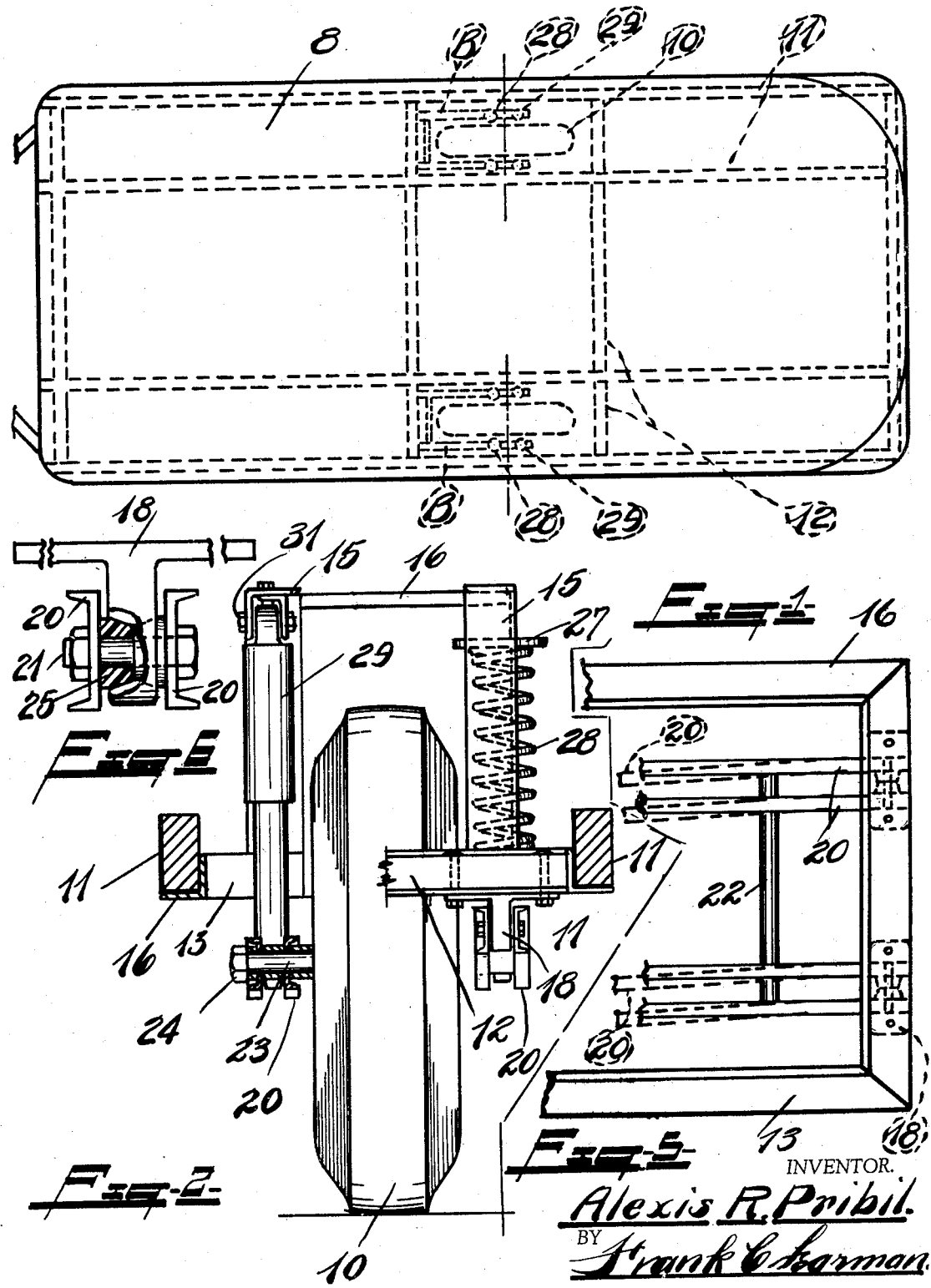

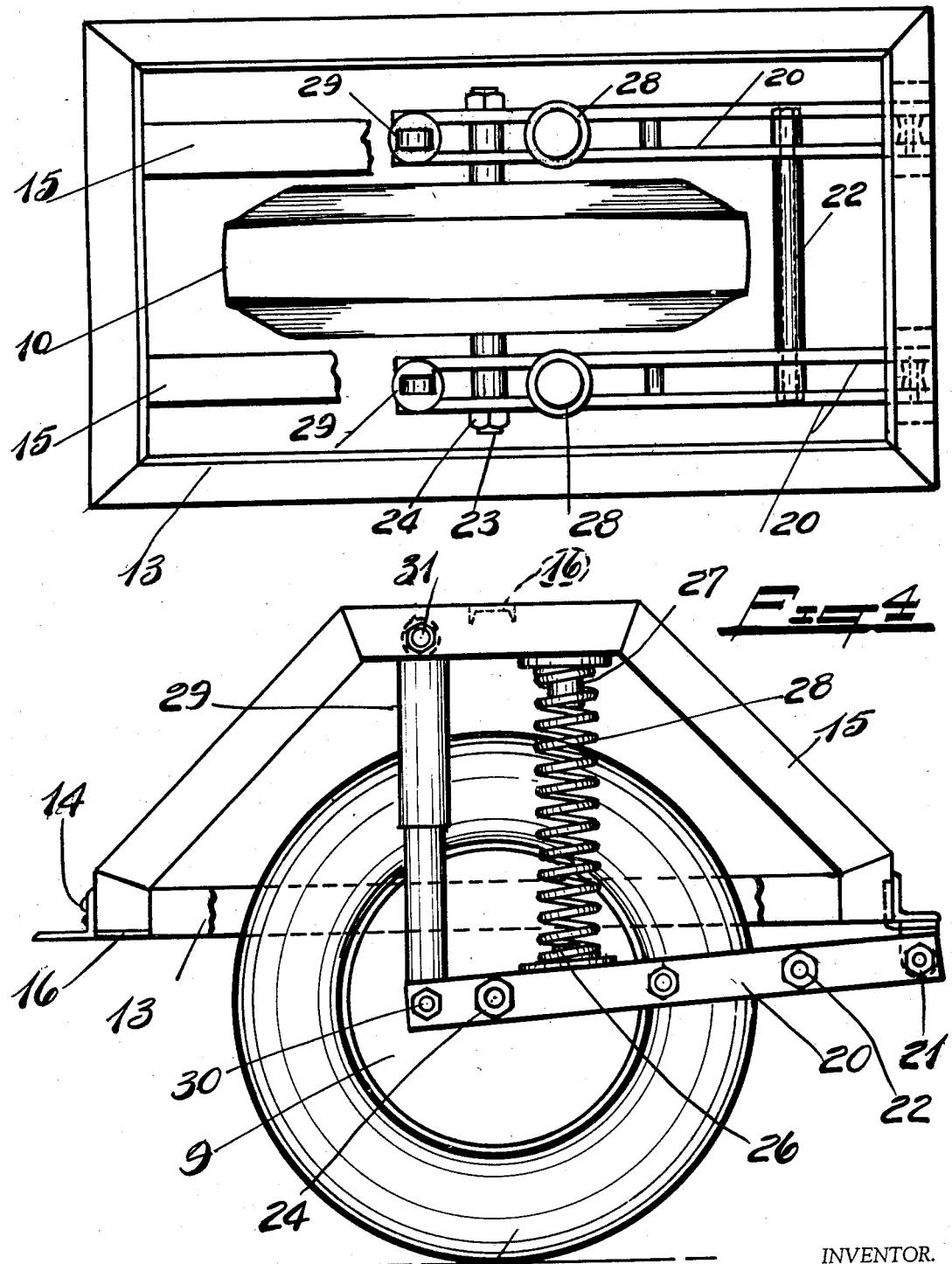

Patented Apr. 20, 1937

2,077,710

UNITED STATES PATENT OFFICE 2,077,710

INDEPENDENT CONTROLLED CUSHION WHEEL UNIT

Alexis R. Pribil, Saginaw, Mich.

Application September 14, 1935, Serial No. 40,540

6 Claims. (Cl. 280—106.5)

This invention relates to independent cushion wheel units such as used on house trailers, baggage trailers, and similar vehicles, which are attached to and drawn by a power vehicle.

One of the prime objects of the invention is to design an independent controlled cushion wheel unit of simple and practical design, which readily fits the frame pockets of the trailer body, and which can be easily mounted in position.

Another object is to provide an independent wheel unit which eliminates the necessity of wheel housings in the trailer body, and which is provided with double action shock absorbers so that the trailer rides evenly and smoothly over rough and uneven roads without bouncing or sharp recoils.

A further object is to provide an independent wheel unit which is in no manner connected to the companion wheel on the opposite side of the chassis, thus eliminating the conventional axle member, and permitting the vehicle body to be slung close to the ground, making it easy to get into or out of, and providing a construction which can be easily and quickly removed or replaced by unskilled labor.

A still further object is to provide a wheel unit which readily absorbs sharp road shocks and impacts, which is of practical and rugged construction which is self-aligning, and which can be readily and economically manufactured and assembled.

The above and other objects will appear as the specification progresses, reference being had to the accompanying drawings in which I have shown the preferred embodiment of my invention, and in which like reference numerals indicate like parts throughout the several views thereof.

In the drawings—

Fig. 1 is a top plan view of a trailer body with my independent cushion wheel units in position thereon.

Fig. 2 is an enlarged end elevational view of one of the wheel units, parts of the wheel frame being broken away to better illustrate the construction.

Fig. 3 is an enlarged side elevational view of one of the wheel units, with the side frame broken away.

Fig. 4 is a top plan view thereof, the bridging being broken away to better illustrate the wheel fork and mounting.

Fig. 5 is a fragmentary detail plan of the wheel frame, the broken lines showing the flexibility of the fork mounting.

Fig. 6 is a detail of one of the pivot brackets and fork, the bracket being broken away to illustrate the resilient bushing.

In the conventional trailer chassis construction there is provided a rear axle on which the two ground engaging wheels are mounted, leaf springs being provided as usual and on which the trailer body proper is suspended. This construction requires wheel housings, etc., is relatively heavy, and the distance from the trailer floor to the ground is determined and governed by the axle clearance and size of the wheel. In my improved construction the axle, leaf springs, wheel housings, etc. are eliminated, a smaller wheel can be used, and I also provide means for absorbing the recoil or rebound occasioned by rough roads or obstacles over which the vehicle travels.

Referring now to the drawings, the numeral 8 indicates a conventional trailer body which is adapted to be coupled to and drawn by a power vehicle (not shown), the rear end of the trailer being supported on ground engaging wheels 9 which are equipped with pneumatic tires 10 as usual.

The trailer frame includes the spaced apart longitudinally disposed members 11 placed in parallel relation, and the transversely disposed members 12 are secured to these members to suitably brace the frame and facilitate the mounting of the wheel units which form the running gear of the vehicle.

Each ground engaging wheel is mounted in a rectangular shaped, fabricated wheel frame 13 which forms a part of each wheel unit, and serves as a wheel housing. This frame is preferably, but not necessarily, formed of structural members secured together by rivets 14 and spaced apart braces 15 form a bridge over the wheel, the ends being rigidly secured to the rectangular frame, while transversely disposed bars 16 serve to reinforce and hold these bridge members in spaced apart relation.

The vehicle frame members 11 and 12 are rigidly mounted on and bolted to the outwardly projecting flanges 16 of the wheel frame 13 by means of bolts 17 so that it forms a rigid inbuilt unit with the body.

Pivot brackets 18 are secured to the forward end of the wheel frame by means of bolts 19, and forked, channel shaped members 20 are secured to each bracket in pairs by means of the bolts 21, being secured together by means of the separator 22, and these channel members form a wheel fork "B" on which the wheel spindle 23 is mounted, and nuts 24 are provided on the end of the spindle for securing said spindle in position, and while in the present instance I have shown a fork formed of structural members, it will be obvious that it may be cast or formed in any other desired manner.

The fork connection to the wheel frame provides for a limited pivotal movement with relation to said frame, resilient rubber bushings 25 being mounted on each bolt 21 so that a resilient self-aligning connection is secured; consequently, any slight misalignment or twisting of the vehicle frame for any reason whatsoever is taken care of by this mounting. Spring seats 26 and 27 are provided on the members 15 and 20 at a point forward of the wheel spindle, and helical springs 28 are interposed therebetween for supporting the weight of the load, and inasmuch as this wheel fork is connected to the wheel frame at the one end only, it will be obvious that the free end on which the wheel 9 is mounted, is free to swing about said hinging point.

Recoil shock absorbers 29 are pivotally connected to the wheel fork, at a point in the rear of the wheel spindle by means of a bolt 30, the upper end of each shock absorber being pivotally connected to the bridge members 15 by means of the bolts 31, each of the bolts 30 and 31 being provided with rubber bushings (not shown), so that a flexible connection is provided, and it will be obvious that as the helical springs 28 are compressed due to passing over uneven roadways or obstacles, that the shock absorbers 29 will absorb the recoil and thus provide smooth and easy riding qualities. These shock absorbers can be of any desired design, either pneumatic or hydraulic, it being merely necessary to have a pivotal connection to the wheel frame and wheel fork.

From the foregoing description it will be clearly obvious that I have perfected a very simple, substantial, and economical independent cushion wheel unit for use on trailers and similar drawn vehicles.

What I claim is:

1. An independent wheel unit of the character described and comprising a main frame, a wheel frame secured thereto, a fork connected to one end of the wheel frame, said connection having a limited transverse swinging movement with relation to the frame, a wheel mounted on the free end of the fork, and vertically disposed resilient means interposed between the wheel frame and the fork.

2. An independent cushion wheel unit of the character described and comprising a main frame, a rectangular wheel frame secured thereto and including horizontally spaced bridge members, a fork hingedly connected to one end of said frame and having a limited pivotal action with relation to the frame, a ground engaging wheel mounted on the free end of the fork at a point intermediate its length, and vertically disposed springs interposed between said fork and the bridge members of the wheel frame.

3. An independent cushion wheel unit comprising a frame including horizontally spaced bridge members, a fork hingedly connected to one end only of said frame and in such manner as to permit of a limited transverse movement with relation thereto, a ground engaging wheel journaled on the free end of the fork, vertically disposed resilient means interposed between the fork and the upper sections of the bridge members of the frame, and shock absorbers spaced from said resilient means and pivotally connected to the fork and upper sections of the bridge members.

4. An independent cushion wheel unit comprising a main frame, a wheel frame secured thereto, a rigid nonrotatable wheel fork hingedly connected to one end of the said wheel frame and mounted to provide for a limited transverse movement with relation thereto, a ground engaging wheel journaled on the free end of the fork at a point intermediate its length, and vertically disposed resilient means interposed between the wheel fork and the upper sections of the wheel frame.

5. In a trailer vehicle comprising a body frame, spaced apart independent wheel units mounted on and secured to said body frame and comprising wheel frames rigidly secured to the body frame, a wheel fork hingedly connected to one end only of the wheel frame, a ground engaging wheel journaled on the free end of each fork at a point intermediate the length thereof, vertically disposed resilient means interposed between the wheel forks and the body frame, and means permitting a limited transverse movement of the wheel with relation to said frame.

6. A vehicle trailer of the class described and comprising a main frame, independent wheel units secured to each side of the frame and including a wheel frame forming a wheel housing, a fork hingedly and resiliently connected to one end only of the wheel frame, a ground engaging wheel journaled thereon, vertically disposed springs interposed between the wheel forks and the upper section of the wheel frame, and shock absorbers connected to the wheel fork and wheel frame respectively.

ALEXIS R. PRIBIL.